United States Patent
Quanci et al.

(10) Patent No.: US 12,465,973 B2
(45) Date of Patent: Nov. 11, 2025

(54) USE OF RESIDUAL IRON WITHIN GRANULATED METALLIC UNIT PRODUCTION FACILITIES, AND ASSOCIATED SYSTEMS, DEVICES, AND METHODS

(71) Applicant: SUNCOKE TECHNOLOGY AND DEVELOPMENT LLC, Lisle, IL (US)

(72) Inventors: John Francis Quanci, Haddonfield, NJ (US); John Michael Richardson, Devon, PA (US); Patrick James Mullarkey, Manhattan, IL (US); David James Schwake, Aurora, IL (US); Andrew Michael Butor, Cranberry Township, PA (US); Jonathan Hale Perkins, Lisle, IL (US); Chun Wai Choi, Lisle, IL (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 0 days.

(21) Appl. No.: 18/882,465

(22) Filed: Sep. 11, 2024

(65) Prior Publication Data
US 2025/0083231 A1   Mar. 13, 2025

Related U.S. Application Data

(60) Provisional application No. 63/581,946, filed on Sep. 11, 2023.

(51) Int. Cl.
*B22F 1/05*   (2022.01)
*B22D 41/12*   (2006.01)
(Continued)

(52) U.S. Cl.
CPC ............. *B22F 1/05* (2022.01); *B22D 41/12* (2013.01); *B22F 9/04* (2013.01); *B22F 9/08* (2013.01);
(Continued)

(58) Field of Classification Search
CPC ...... B22F 1/05; B22F 9/04; B22F 9/08; B22F 2009/001; B22F 2009/0808;
(Continued)

(56) References Cited

U.S. PATENT DOCUMENTS 2,052,783 A    9/1936   Mart
3,316,075 A    4/1967   Grady
(Continued)

FOREIGN PATENT DOCUMENTS

CN    1847411 A    10/2006
CN    101301683 A    11/2008
(Continued)

OTHER PUBLICATIONS

KR 100370611B1 Translation (Year: 2003).*
(Continued)

*Primary Examiner* — Danielle M. Carda
(74) *Attorney, Agent, or Firm* — Perkins Coie LLP; Vijay S. Kumar

(57) ABSTRACT

Reduced-waste systems and methods for granulated metallic units (GMUs) production are disclosed herein. A representative method can include receiving a first supply of molten iron and producing GMUs by granulating the molten iron poured onto a target material of a reactor. The method can include removing residual fines of the GMUs via a classifier based on a threshold particle size and mixing the residual fines with a second supply of molten iron to produce additional GMUs.

18 Claims, 8 Drawing Sheets

(51) Int. Cl.

| | | |
|---|---|---|
| B22F 9/04 | (2006.01) | |
| B22F 9/08 | (2006.01) | |
| B61D 7/02 | (2006.01) | |
| B61D 7/32 | (2006.01) | |
| B61D 17/18 | (2006.01) | |
| B61K 13/00 | (2006.01) | |
| C02F 1/52 | (2023.01) | |
| C21B 5/00 | (2006.01) | |
| C21B 7/14 | (2006.01) | |
| C21B 13/00 | (2006.01) | |
| C21C 5/52 | (2006.01) | |
| C21C 7/00 | (2006.01) | |
| C21C 7/064 | (2006.01) | |
| C21C 7/068 | (2006.01) | |
| C22C 33/00 | (2006.01) | |
| C22C 33/02 | (2006.01) | |
| C22C 38/00 | (2006.01) | |
| C22C 38/02 | (2006.01) | |
| C22C 38/04 | (2006.01) | |
| G01G 13/00 | (2006.01) | |
| B22F 9/00 | (2006.01) | |
| B61D 7/00 | (2006.01) | |
| C02F 101/20 | (2006.01) | |
| C02F 103/02 | (2006.01) | |
| C02F 103/10 | (2006.01) | |
| C02F 103/16 | (2006.01) | |

(52) U.S. Cl.
CPC ............... *B61D 7/02* (2013.01); *B61D 7/32* (2013.01); *B61D 17/18* (2013.01); *B61K 13/00* (2013.01); *C02F 1/52* (2013.01); *C21B 5/008* (2013.01); *C21B 7/14* (2013.01); *C21B 13/0006* (2013.01); *C21C 5/52* (2013.01); *C21C 5/527* (2013.01); *C21C 7/0006* (2013.01); *C21C 7/0075* (2013.01); *C21C 7/064* (2013.01); *C21C 7/068* (2013.01); *C22C 33/006* (2013.01); *C22C 33/0257* (2013.01); *C22C 33/0264* (2013.01); *C22C 33/0271* (2013.01); *C22C 38/002* (2013.01); *C22C 38/02* (2013.01); *C22C 38/04* (2013.01); *G01G 13/006* (2013.01); *B22F 2009/001* (2013.01); *B22F 2009/0808* (2013.01); *B22F 2301/35* (2013.01); *B22F 2304/15* (2013.01); *B22F 2998/10* (2013.01); *B22F 2999/00* (2013.01); *B61D 7/00* (2013.01); *C02F 2101/20* (2013.01); *C02F 2101/203* (2013.01); *C02F 2103/023* (2013.01); *C02F 2103/10* (2013.01); *C02F 2103/16* (2013.01); *C02F 2209/40* (2013.01); *C02F 2301/02* (2013.01); *Y10T 428/2982* (2015.01)

(58) Field of Classification Search
CPC ............ B22F 2301/35; B22F 2304/15; B22F 2998/10; B22F 2999/00; B22D 41/12; B61D 7/02; B61D 7/32; B61D 17/18; B61D 7/00; B61K 13/00; C02F 1/52; C02F 2103/16; C02F 2301/02; C02F 2101/20; C02F 2101/203; C02F 2103/023; C02F 2103/10; C02F 2209/40; C21B 7/14; C21B 13/0006; C21B 5/008; C21C 5/52; C21C 7/0006; C21C 7/0075; C21C 7/064; C21C 7/068; C21C 5/527; C22C 33/006; C22C 33/0264; C22C 33/0271; C22C 38/002; C22C 38/02; C22C 38/04; C22C 33/0257; G01G 13/006; Y10T 428/2982

USPC ............................................................ 75/340
See application file for complete search history.

(56) References Cited

U.S. PATENT DOCUMENTS

| | | | |
|---|---|---|---|
| 3,548,919 A | 12/1970 | Gyongyos et al. | |
| 3,720,404 A | 3/1973 | Carleton et al. | |
| 3,810,542 A | 5/1974 | Gloster et al. | |
| 3,888,956 A * | 6/1975 | Klint | B01J 2/04 |
| | | | 75/331 |
| 3,898,037 A | 8/1975 | Lange et al. | |
| 3,923,935 A | 12/1975 | Cates | |
| 4,139,369 A | 2/1979 | Kandler et al. | |
| 4,153,965 A | 5/1979 | Merly | |
| 4,294,784 A | 10/1981 | Mailund | |
| 4,330,511 A | 5/1982 | Nelson et al. | |
| 4,402,884 A | 9/1983 | Koike et al. | |
| 4,416,707 A | 11/1983 | Foster et al. | |
| 4,546,907 A | 10/1985 | Kemble | |
| 4,694,886 A | 9/1987 | Sakaguchi | |
| 4,786,322 A | 11/1988 | Green | |
| 4,893,568 A | 1/1990 | Adams | |
| 5,017,218 A | 5/1991 | Lundström et al. | |
| 5,084,093 A | 1/1992 | Yamaoka et al. | |
| 5,458,671 A | 10/1995 | Butler et al. | |
| 5,552,058 A | 9/1996 | Fanning | |
| 5,673,779 A | 10/1997 | Spickelmire | |
| 6,041,906 A | 3/2000 | Howard | |
| 6,287,362 B1 | 9/2001 | Levey et al. | |
| 8,646,700 B2 | 2/2014 | Lundström et al. | |
| 9,840,746 B2 | 12/2017 | Lundström | |
| 10,486,234 B2 | 11/2019 | Lundström | |
| 10,618,112 B2 | 4/2020 | Lundström | |
| 2001/0002535 A1 | 6/2001 | Liebig et al. | |
| 2002/0026967 A1 | 3/2002 | Buenemann et al. | |
| 2003/0015315 A1 | 1/2003 | Atsushi et al. | |
| 2003/0164062 A1 | 9/2003 | Lundstrom et al. | |
| 2005/0133192 A1 | 6/2005 | Meszaros et al. | |
| 2009/0015028 A1 | 1/2009 | Zamorano | |
| 2009/0171512 A1 | 7/2009 | Duncan | |
| 2013/0180360 A1 | 7/2013 | Kim et al. | |
| 2015/0330725 A1 | 11/2015 | Gurney | |
| 2020/0122237 A1* | 4/2020 | Kemper | C21C 7/0087 |
| 2025/0083222 A1 | 3/2025 | Quanci et al. | |
| 2025/0083223 A1 | 3/2025 | Quanci et al. | |
| 2025/0083224 A1 | 3/2025 | Quanci et al. | |
| 2025/0083230 A1 | 3/2025 | Quanci et al. | |
| 2025/0083232 A1 | 3/2025 | Quanci et al. | |
| 2025/0083713 A1 | 3/2025 | Quanci et al. | |
| 2025/0083980 A1 | 3/2025 | Quanci et al. | |
| 2025/0084496 A1 | 3/2025 | Quanci et al. | |
| 2025/0085156 A1 | 3/2025 | Quanci et al. | |

FOREIGN PATENT DOCUMENTS

| | | |
|---|---|---|
| CN | 102700957 A | 10/2012 |
| CN | 103661440 B | 1/2016 |
| CN | 205496553 U | 8/2016 |
| CN | 107385135 | 11/2017 |
| CN | 107385135 A | 11/2017 |
| CN | 207205279 U | 4/2018 |
| CN | 110141947 | 8/2019 |
| CN | 212049627 U | 12/2020 |
| CN | 112305944 A | 2/2021 |
| CN | 113549715 A | 10/2021 |
| CN | 214470214 U | 10/2021 |
| CN | 113828788 A | 12/2021 |
| CN | 114433854 A | 5/2022 |
| CN | 216709283 U | 6/2022 |
| CN | 115417184 A | 12/2022 |
| CN | 115889716 A | 4/2023 |
| CN | 116550982 A | 8/2023 |
| GB | 1287510 A | 8/1972 |
| JP | H02236212 A | 9/1990 |
| JP | H06212212 A | 8/1994 |
| JP | 2001107118 A | 4/2001 |

(56) References Cited

FOREIGN PATENT DOCUMENTS

| | | | | |
|---|---|---|---|---|
| JP | 2002282866 | A | 10/2002 | |
| JP | 2005154847 | A | 6/2005 | |
| JP | 2020164992 | A | 10/2020 | |
| JP | 7033949 | B2 | 3/2022 | |
| JP | 2022149432 | A | 10/2022 | |
| KR | 20010111750 | A * | 12/2001 | ............... C22B 1/14 |
| KR | 100370611 | B1 * | 2/2003 | ............... C22B 1/14 |
| KR | 100847667 | B1 | 7/2008 | |
| KR | 101086315 | B1 | 11/2011 | |
| KR | 101091977 | B1 | 12/2011 | |
| KR | 20130076110 | A | 7/2013 | |
| KR | 20140102742 | A | 8/2014 | |
| KR | 20140120631 | A | 10/2014 | |
| KR | 20160034000 | A | 3/2016 | |
| KR | 101649584 | B1 | 8/2016 | |
| KR | 20230028951 | A | 3/2023 | |
| WO | 2007105039 | A2 | 9/2007 | |

OTHER PUBLICATIONS

Italimpianti Orafi, "Atomized metal powder: the revolution of the precious metals market" Online article, May 20, 2021 (Year: 2021).*
International Iron Metallics Association (IIMA), "Use of Granulated Pig Iron (GPI) in the Electric Arc Furnace (EAF)," downloaded Nov. 30, 2024, dated 2018 (no month) (two pages) [wayback machine date of Feb. 9, 2022].
International Search Report and Written Opinion for International Application No. PCT/US2024/046281; Date of Mailing: Dec. 24, 2024; 10 pages.
U.S. Appl. No. 18/882,116, filed Sep. 11, 2024, titled Railcars for Transporting Granulated Metallic Units, and Associated Systems, Devices and Methods.
U.S. Appl. No. 18/882,045, filed Sep. 11, 2024, titled Loading Granulated Metallic Units Into Railcars, and Associated Systems, Devices and Methods.
U.S. Appl. No. 18/882,191, filed Sep. 11, 2024, titled Low-Sulfur Granulated Metallic Units, and Associated Systems, Devices and Methods.
U.S. Appl. No. 18/882,638, filed Sep. 11, 2024, titled Continuous Granulated Metallic Units Production, and Associated Systems, Devices, and Methods.
U.S. Appl. No. 18/882,661, filed Sep. 11, 2024, titled Use of a Basic Oxygen Furnace to Produce Granulated Metallic Units, and Associated Systems, Devices, and Methods.
U.S. Appl. No. 18/882,256, filed Sep. 11, 2024, titled Low-Carbon Granulated Metallic Units, and Associated Systems, Devices, and Methods.
U.S. Appl. No. 18/882,531, filed Sep. 11, 2024, titled Torpedo Cars for Use With Granulated Metallic Unit Production, and Associated Systems, Devices, and Methods.
U.S. Appl. No. 18/882,384, filed Sep. 11, 2024, titled Treating Cooling Water in Iron Production Facilities, and Associated Systems, Devices, and Methods.
U.S. Appl. No. 18/882,501, filed Sep. 11, 2024, titled Processing Granulated Metallic Units Within Electric Arc Furnaces, and Associated Systems and Methods.
"Granulation of Hot Metal," by 360 Editor, Apr. 23, 2018, 4 pages.
Beskow et al., "Industrial and High-Capacity Production of Granulated Pig Iron," Association for Iron & Steel Technology, AISTech, May 6-9, 2019, pp. 485-493.
Beskow et al., "World's First High-capacity Granshot© Iron Granulation in Operation at SSAB Oxelosund," AISTech 2009 Proceedings—vol. I, pp. 211-218.
Dupon et al., "Granshot Iron Granulation for Optimized Plant Logistics," METEC InSteelCon Jun. 27-Jul. 1, 2011, Düsseldorf, Germany; 7 pages.
Granulated Pig Iron (GPI), International Iron Metallics Association, accessed Sep. 17, 2024 from https://www.metallics.org/gpi.html; 4 pages.
Industrial and High Capacity Granulation of Pig Iron, Data Sheet, Uvån Hagfors Teknologi AB, Jun. 2019, 4 pages.
Love et al., "Energy Recovery in Granshot©—Process," KTH Industrial Engineering and Management, Stockholm, Sweden, Nov. 25, 2008, 70 pages.
Lundstrom et al., "Pig Iron Granulation at Iscor Saldanha Steel," AISTech 2004 Proceedings—vol. I, pp. 517-524.
Lundstrom, P. "Iron Granulation in Integrated Steel Plants," Nordic Steel & Mining Review 2006, pp. 16-17.
Polanco et al., "Granulation Methods for Metals and Ferroalloys," pp. 401-410. In: 72nd ABM Annual Congress, São Paulo, 2017.
Vesterberg et al., "Granulated metal product from direct tapped furnace—experience from operation at BEFESA Sweden," ATS-JSI Conference, Dec. 17-18, 2012, Paris, France, 2 pages.

* cited by examiner

USE OF RESIDUAL IRON WITHIN GRANULATED METALLIC UNIT PRODUCTION FACILITIES, AND ASSOCIATED SYSTEMS, DEVICES, AND METHODS

CROSS-REFERENCE TO RELATED APPLICATIONS

The present application claims the benefit of U.S. Provisional Patent Application No. 63/581,946, filed Sep. 11, 2023, and titled "SYSTEM AND METHOD FOR CONTINUOUS GRANULATED PIG IRON (GPI) PRODUCTION," the disclosure of which is incorporated herein by reference in its entirety. The present application is related to the following applications, the disclosures of which are incorporated herein by reference in their entireties: U.S. patent application Ser. No. 18/882,116, filed Sep. 11, 2024, and titled "RAILCARS FOR TRANSPORTING GRANULATED METALLIC UNITS, AND ASSOCIATED SYSTEMS, DEVICES, AND METHODS"; U.S. patent application Ser. No. 18/882,045, filed Sep. 11, 2024, and titled "LOADING GRANULATED METALLIC UNITS INTO RAILCARS, AND ASSOCIATED SYSTEMS, DEVICES, AND METHODS"; U.S. patent application Ser. No. 18/882,191, filed Sep. 11, 2024, and titled "LOW-SULFUR GRANULATED METALLIC UNITS, AND ASSOCIATED SYSTEMS, DEVICES, AND METHODS"; U.S. patent application Ser. No. 18/882,638, filed Sep. 11, 2024, and titled "CONTINUOUS GRANULATED METALLIC UNIT PRODUCTION, AND ASSOCIATED SYSTEMS, DEVICES, AND METHODS"; U.S. patent application Ser. No. 18/882,661, filed Sep. 11, 2024, and titled "USE OF A BASIC OXYGEN FURNACE TO PRODUCE GRANULATED METALLIC UNITS, AND ASSOCIATED SYSTEMS, DEVICES, AND METHODS"; U.S. patent application Ser. No. 18/882,256, filed Sep. 11, 2024, and titled "LOW-CARBON GRANULATED METALLIC UNITS, AND ASSOCIATED SYSTEMS, DEVICES, AND METHODS"; U.S. patent application Ser. No. 18/882,531, filed Sep. 11, 2024, and titled "TORPEDO CARS FOR USE WITH GRANULATED METALLIC UNIT PRODUCTION, AND ASSOCIATED SYSTEMS, DEVICES, AND METHODS"; U.S. patent application Ser. No. 18/882,384, filed Sep. 11, 2024, and titled "TREATING COOLING WATER IN IRON PRODUCTION FACILITIES, AND ASSOCIATED SYSTEMS, DEVICES, AND METHODS"; U.S. patent application Ser. No. 18/882,501, filed Sep. 11, 2024, and titled "PROCESSING GRANULATED METALLIC UNITS WITHIN ELECTRIC ARC FURNACES, AND ASSOCIATED SYSTEMS AND METHODS".

TECHNICAL FIELD

The present technology generally relates to granulated metallic unit production, and associated systems and methods.

BACKGROUND

Granulated pig iron (GPI) is a form of pig iron that is granulated into small, uniform particles, making it easier to handle, transport, and use in different metallurgical processes compared to conventional pig iron. The demand for GPI has been steadily increasing due to its versatile applications in various industries, including automotive, construction, and manufacturing. The growing popularity of GPI can be attributed to its high purity, consistent quality, and the efficiency it brings to the production of steel and other iron-based products.

Granulated pig iron is produced by rapidly cooling molten pig iron with water, resulting in the formation of granules. This process, known as granulation, is typically carried out in blast furnaces. However, current production methods are often characterized by intermittent production cycles due to various operational constraints, such as the need for periodic maintenance, fluctuations in raw material supply, and energy consumption issues. These interruptions not only affect the overall efficiency but also lead to increased production costs and variability in product quality. Therefore, there is a need for an improved production process that can ensure continuous and stable granulation of pig iron, thereby enhancing productivity and reducing operational costs.

BRIEF DESCRIPTION OF THE DRAWINGS

Features, aspects, and advantages of the presently disclosed technology may be better understood with regard to the following drawings.

Figure 1:
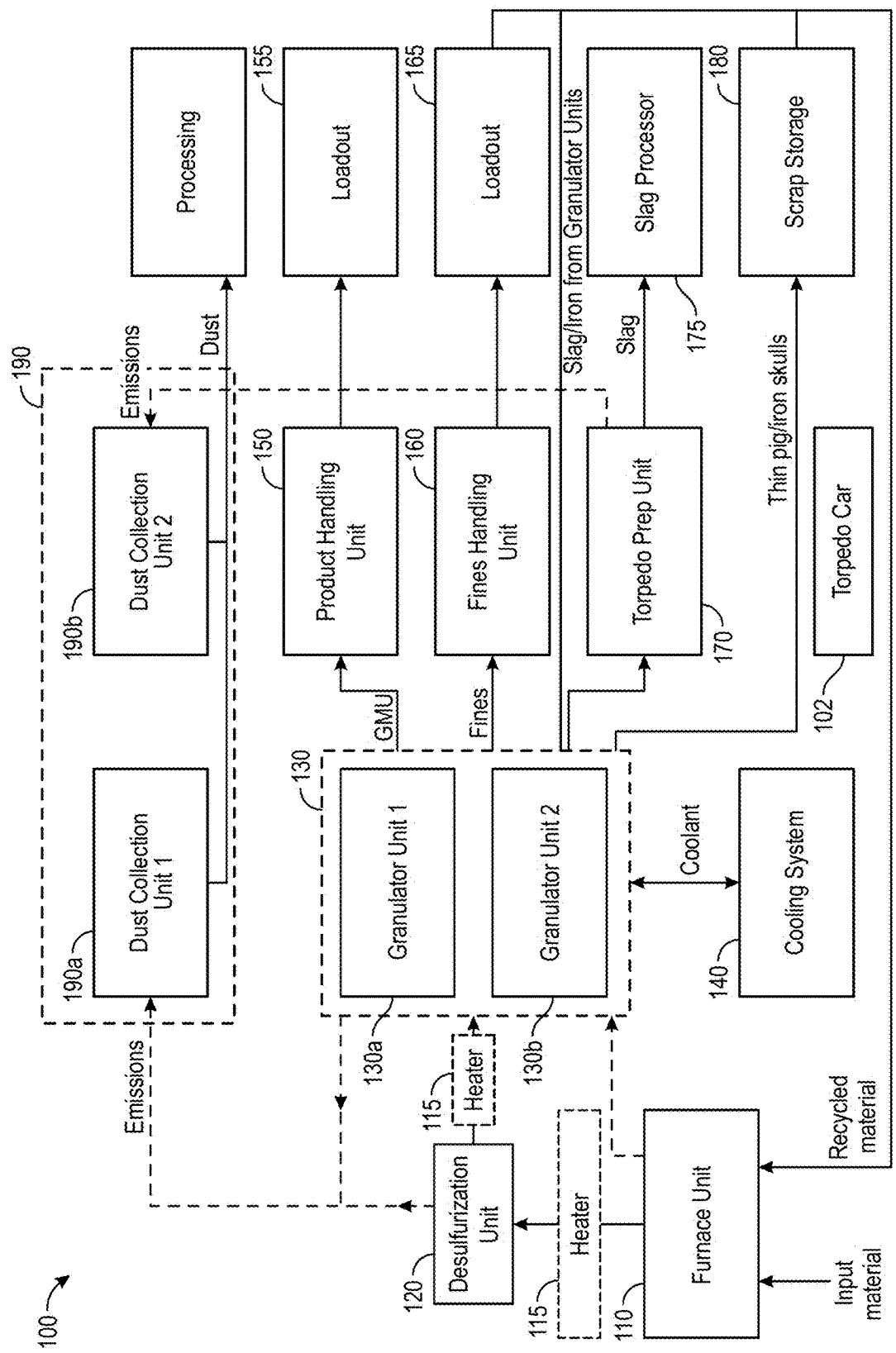
FIG. 1 is a schematic block diagram of a continuous granulated metallic unit (GMU) production system configured in accordance with embodiments of the present technology.

A person skilled in the relevant art will understand that the features shown in the drawings are for purposes of illustrations, and variations, including different and/or additional features and arrangements thereof, are possible.

DETAILED DESCRIPTION

I. Overview

Embodiments of the present technology relate to reduced-waste systems and methods for granulated metallic unit (GMU) production. Residual iron (also referred to as processed iron) waste is a byproduct of iron processing that includes various forms of impurities. Such waste can contribute to environmental pollution, such as soil contamination, water pollution, and air pollution. Removal of residual iron waste from the environment (e.g., treatment of contaminated soil, water, or air) is challenging, and preventing these harmful effects by proper waste management techniques by adhering to environmental regulations and standards can be inefficient and expensive. Therefore, there is a need for iron production systems and methods that produce zero or nearly zero residual iron waste.

In operation, residual iron waste is formed as a byproduct in the production of GMU. Residual iron waste can include, for example, thin pig, steel, skulls, sinter, scrap, slag, iron dust, or residual fines (e.g., GMUs having a particle size that is too small for further processing of GMUs). The various byproducts and impurities can be generated by smelting, granulation, de-sulfuration, transfers, and collected as residual iron waste throughout the process.

Embodiments of the present technology address at least some of the above-described issues, and include methods and systems for recycling residual iron of different types back to the production. For example, embodiments of the present technology include a method of receiving molten iron and producing GMU particles by granulating the molten iron. The granulation includes pouring the molten iron onto a target material of a reactor, and removing residual fines of the GMU particles (e.g., an end-product) via a classifier. The classifier can separate residual fines from the GMU based on a threshold particle size. The method can also include recycling the residual fines by mixing the residual fines with a second supply of molten iron, different than the first supply of molten iron, to produce additional GMU particles. As another example, embodiments of the present technology include a method of producing residual iron, such as skulls, thin pig, steel, sinter, scrap, slag, or iron dust, as a byproduct of producing the GMU particles. The method can include mixing at least a portion of the residual iron with scrap metal (used as a feedstock material for molten iron) to produce a blend and recycling the at least a portion of the blend to a blast furnace and/or a basic oxygen furnace to produce the of molten iron. Furthermore, the method can include using recycled, imported residual fines or residual iron in the system to produce molten iron and/or GMU particles.

The present technology thereby describes methods and systems that allow different types of residual iron waste, i.e., residual fines separated from the end-product GMU by a classifier and other residual iron such as thin pig, steel, skulls, sinter, scrap, slag, or iron dust collected in the process, to be recycled within the system to produce more molten iron and/or GMU particles. The present technology can significantly reduce environmental waste as well as increase the production efficiency of GMU production systems. Additional benefits of embodiments of the present technology are described elsewhere herein.

In the Figures, identical reference numbers identify generally similar, and/or identical, elements. Many of the details, dimensions, and other features shown in the Figures are merely illustrative of particular embodiments of the disclosed technology. Accordingly, other embodiments can have other details, dimensions, and features without departing from the spirit or scope of the disclosure. In addition, those of ordinary skill in the art will appreciate that further embodiments of the various disclosed technologies can be practiced without several of the details described below.

The disclosed GMU production system is designed for continuous operation. Relative to non-continuous GMU production systems, embodiments of the present technology enhance energy efficiency and reduce emissions by minimizing the need for frequent shutdowns and restarts, which are often associated with excessive venting and/or less efficient operations. As described herein, some embodiments include (i) a desulfurization unit that lowers the sulfur content in molten metal, thereby reducing sulfur dioxide ($SO_2$) emissions, (ii) dust collection units that filter out particulate matter, thereby reducing air pollution, (iii) infrastructure to recycle fines, slag, iron skulls and other residual iron/previously-processed iron, thereby reducing the environmental impact associated with raw material extraction and conserving natural resources, and/or (iv) water management and cooling systems that minimize heat losses, enhance thermal efficiency of production processes, and optimize water consumption. Overall, the continuous GMU production system enhances productivity while minimizing greenhouse gas emissions and waste, contributing to more sustainable industrial practices and helping mitigate climate change.

Relatedly, conventional iron production has a significant environmental impact due to its high energy consumption and emissions of pollutants. As such, embodiments of the present technology which relate to GMU production systems can reduce this impact. Sulfur, phosphorus, and silicon in GMU negatively affect the quality and properties of final metal products, leading to issues like reduced ductility, toughness, and weldability, as well as surface defects and brittleness. These impurities also contribute to the formation of non-metallic inclusions and excessive slag, complicating metal processing and compromising product quality. Sulfur, in particular, accelerates the wear and erosion of metal processing equipment, increasing maintenance costs and decreasing equipment lifespan. Embodiments of the present technology include methods for removing these impurities in part can improve the quality and durability of final metal products and enhances the efficiency and lifespan of processing equipment, leading to cost savings and more sustainable production practices.

Further, the disclosed technology is directed to recycling residual iron and residual fines within the GMU production system to reduce iron losses and to further reduce the climate effects of iron production, as discussed above. A representative method includes, for example, receiving a first supply of molten iron and producing GMUs by granulating the molten iron poured onto a target material of a reactor. The method can include removing residual fines of the GMUs via a classifier based on a threshold particle size and recycling the residual fines by mixing the residual fines with a second supply of molten iron to produce additional GMUs.

II. Embodiments of a Continuous Granulated Metallic Unit Production System

FIG. 1 is a schematic block diagram of a continuous GMU production system 100 ("the system 100") configured in accordance with embodiments of the present technology. As explained elsewhere herein, GMUs can include granulated iron (GI), granulated pig iron (GPI), granulated steel (GS), or GMU. Relatedly, molten metal can include molten pig iron or molten steel. As used herein, the term "continuous" should be interpreted to mean continuous operations cycles, including in batch or semi-batch operations, for at least 4 hours, 6 hours, 8 hours, 10 hours, 12 hours, 16 hours, 20 hours, or 24 hours. The system 100 can include a furnace unit 110, a desulfurization unit 120, granulator units 130 including a first granulator unit 130a and a second granulator unit 130b, and a cooling system 140. The furnace unit 110 can receive input materials (e.g., iron ore, coke, limestone, and/or preheated air) and/or recycled material, which can be sourced from downstream components of the system 100 as described in further detail herein. Equations (1)-(6) below detail some of the chemical processes controlled at the furnace unit.

$$C + O_2 \rightarrow CO_2 \quad (1)$$

$$CO_2 + C \rightarrow 2CO \quad (2)$$

$$Fe_2O_3 + 3CO \rightarrow 2Fe + 3CO_2 \quad (3)$$

$$Fe_2O_3 + 3C \rightarrow 2Fe + 3CO \quad (4)$$

$$CaCO_3 \rightarrow CaO + CO_2 \quad (5)$$

$$CaO + SiO_2 \rightarrow CaSiO_3 \quad (6)$$

Equation (1) represents the combustion of coke, which is a form of carbon. When coke reacts with oxygen gas introduced into the furnace (e.g., via an oxygen lance), it forms carbon dioxide. This exothermic reaction releases a significant amount of heat, which is essential for maintaining the high temperatures required for subsequent reactions. The carbon dioxide produced via Equation (1) further reacts with additional coke to form carbon monoxide, as illustrated by Equation (2). This endothermic reaction helps to moderate the temperature within the furnace unit 110. Equations (3) and (4) represent the reduction of iron ore ($Fe_2O_3$). As illustrated by Equation (3), the iron oxide reacts with the carbon monoxide produced via Equation (2), which acts as a reducing agent to convert iron ore into iron and produces carbon dioxide as a byproduct. Alternatively, as illustrated by Equation (4), the iron ore may be reduced directly by the coke, albeit less commonly. Equations (5) and (6) represent the formation of slag. As illustrated by Equation (5), the calcium carbonate/limestone ($CaCO_3$) can decompose into calcium oxide and carbon dioxide at the high temperatures of the furnace unit 110. As illustrated by Equation (6), the calcium oxide can then react with silica ($SiO_2$), an impurity in the iron ore, to form calcium silicate ($CaSiO_3$), also known as slag. The furnace unit 110 can output molten iron (from Equations (3) and (4)) and slag (from Equations (5) and (6)).

In some embodiments, the input materials (e.g., the coke, the iron ore, and/or the limestone) include sulfur, which can remain in the molten iron output by the furnace unit 110. A torpedo car 102 or other transfer vessel can transfer the molten iron from the furnace unit 110 to the desulfurization unit 120. The desulfurization unit 120 can include equipment to reduce the sulfur content of the molten iron. For example, one or more lances can be used to deliver magnesium (Mg), calcium carbide ($CaC_2$), or other sulfur-reducing agent to the molten iron. In some embodiments, the molten iron is desulfurized while remaining inside the torpedo car 102. Equations (7) and (8) below detail the reactions between the sulfur and the sulfur-reducing agents.

$$Mg + S \rightarrow MgS \quad (7)$$

$$CaC_2 + S \rightarrow CaS + 2C \quad (8)$$

The resulting substances, including magnesium sulfide (MgS) and calcium sulfide (CaS), are not soluble in molten iron and will therefore be in solid form (e.g., as solid particles) that can be more readily removed at the desulfurization unit 120 and/or further downstream. As discussed further herein, reducing the sulfur content can increase the quality of the GMU product and/or allow the production process to be continuous. After the desulfurization process, the torpedo car 102 can transfer the molten iron from the desulfurization unit 120 to the granulator units 130. In some embodiments, as indicated by the dashed arrow, the desulfurization unit 120 is bypassed and the molten iron is transferred directly from the furnace unit 110 to the granulator units 130. Notably, conventional facilities may not include a desulfurization unit or may otherwise lack the ability to desulfurize molten iron. One reason for this is that conventional steelmaking facilities directly feed molten iron from blast furnaces to basic oxygen furnaces, and opt to granulate the molten iron only when the basic oxygen furnaces are down. Because producing GMU is a backup operation for such facilities, the added complexity and costs associated with establishing desulfurization equipment may not be economical.

In some embodiments, the temperature of the molten iron is within a predetermined range prior to reaching the granulator units 130. For example, maintaining the molten iron in a sufficiently fluid state can better ensure the formation of uniform granules and help avoid premature solidification, which can lead to irregular granule shapes and sizes. In some embodiments, the system includes one or more heaters 115 before and/or after the desulfurization unit 120, e.g., to reheat the molten iron within the torpedo car 102. For example, if the temperature of the molten iron is below a threshold temperature value, the heater 115 can be used to raise the temperature of the molten iron in the torpedo car 102 to be within a desired temperature range. The threshold temperature value can vary between different compositions, and can be between 2300-2500° F., between 2300-2400° F., or between 2340-2350° F. In some embodiments, the heater 115 comprises one or more oxygen lances.

The torpedo car 102 can transfer the molten iron to one of the granulator units 130. While FIG. 1 illustrates two granulator units 130, it will be understood that the system 100 can include one, three, four, five, six, or more granulator units 130. The granulator units 130 can each include a granulation reactor that receives and granulates molten iron to form granulated products. For example, the granulation reactor can include a cavity that holds water, and the molten iron can be transferred (e.g., poured, sprayed) onto a target of the reactor holding the water. The water can be maintained at a sufficiently low temperature by the cooling system 140 (e.g., cooled directly by pumping the water between the granulator units 130 and the cooling system 140, cooled indirectly by pumping a coolant separate from the water that receives the molten iron). In some embodiments, the granulator units 130 each includes one or more components for controlling the flow of molten iron from the torpedo car 102 to the granulation reactor. As one of ordinary skill in the art will appreciate, flow control can affect the shape, size, and quality of the granulated products. The granulator units 130 can also include a dewatering assembly for drying the granulated products from the granulation reactor to output GMU. The granulator units 130 can further include a classifier assembly for filtering the filtrate from the dewatering assembly to output fines.

The system 100 can further include a product handing unit 150 to receive the GMU output by the granulator units 130 (e.g., by the dewatering assembly), and a loadout 155 downstream of the product handling unit 150. Additionally, the system 100 can further include a fines handling unit 160 to receive the fines output by the granulator units 130 (e.g., by the classifier assembly), and a loadout 165 downstream of the fines handling unit 160. In some embodiments, the product handling unit 150 and/or the fines handling unit 160 each includes one or more conveyor belts, diverters, stockpile locations, etc. The system 100 can additionally include a torpedo preparation unit 170 that can remove slag and/or kish from the torpedo car 102. For example, the torpedo car 102, after delivering the molten iron to the granulator units 130, can proceed to the torpedo prep unit 170 to be cleaned or otherwise prepared for the next cycle of transferring molten iron. The removed slag can be subsequently transferred to a slag processor 175. The system 100 can further include a scrap storage 180 that can receive thin pig and/or iron skulls from the granulator units 130.

As shown in FIG. 1, the fines at the loadout 165, slag and/or iron from the granulator units 130, and/or the thin pig and/or iron skulls at the scrap storage 180 can be fed back into the furnace unit 110 as recycled materials. In some embodiments, the recycled materials are processed (e.g., pelletized) prior to being fed into the furnace unit 110. Furthermore, emissions from various components of the system 100 can be collected and directed towards a dust collection unit 190 (e.g., a baghouse, a scrubber, etc.). In FIG. 1, for example, the emissions from the desulfurization unit 120 and the granulator units 130 are directed to a first dust collection unit 190a, and the emissions from the torpedo prep unit 170 are directed to a second dust collection unit 190b. Each of the dust collection units 190 can filter the emissions to remove dust therefrom so that clean waste gas is sent to stacks (not shown) to be released into the atmosphere, and the removed dust can be directed to further processing.

Figure 2:
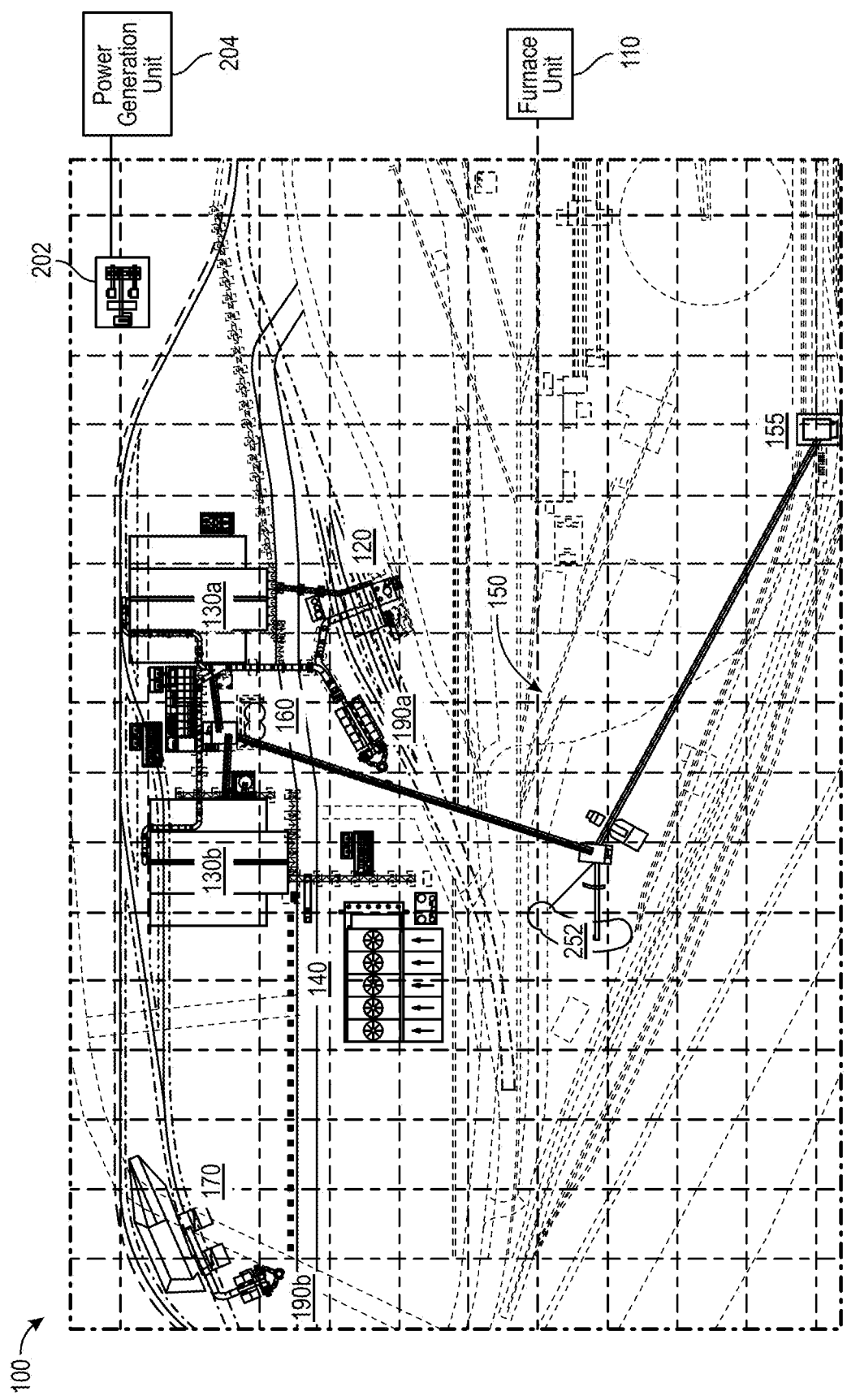
FIG. 2 is a plan view of the continuous GMU production system of FIG. 1, configured in accordance with embodiments of the present technology.

FIG. 2 is a plan view of the continuous GMU production system 100. It will be appreciated that the plan view illustrated in FIG. 2 is merely one example, and that the components of the system 100 can be arranged differently in other embodiments. As shown, the system 100 can further include an electrical building 202 and a power generation unit 204 for providing electrical power to the system 100. As discussed further herein, one or more of the components of the system 100 can be powered electrically as opposed to, e.g., hydraulically. The furnace unit 110 can be located away from many of the other components of the system 100. The torpedo car 102 or other transfer vessel (not shown) can transfer the molten iron from the furnace unit 110 to the desulfurization unit 120 along tracks illustrated in dashed lines.

Figure 3:
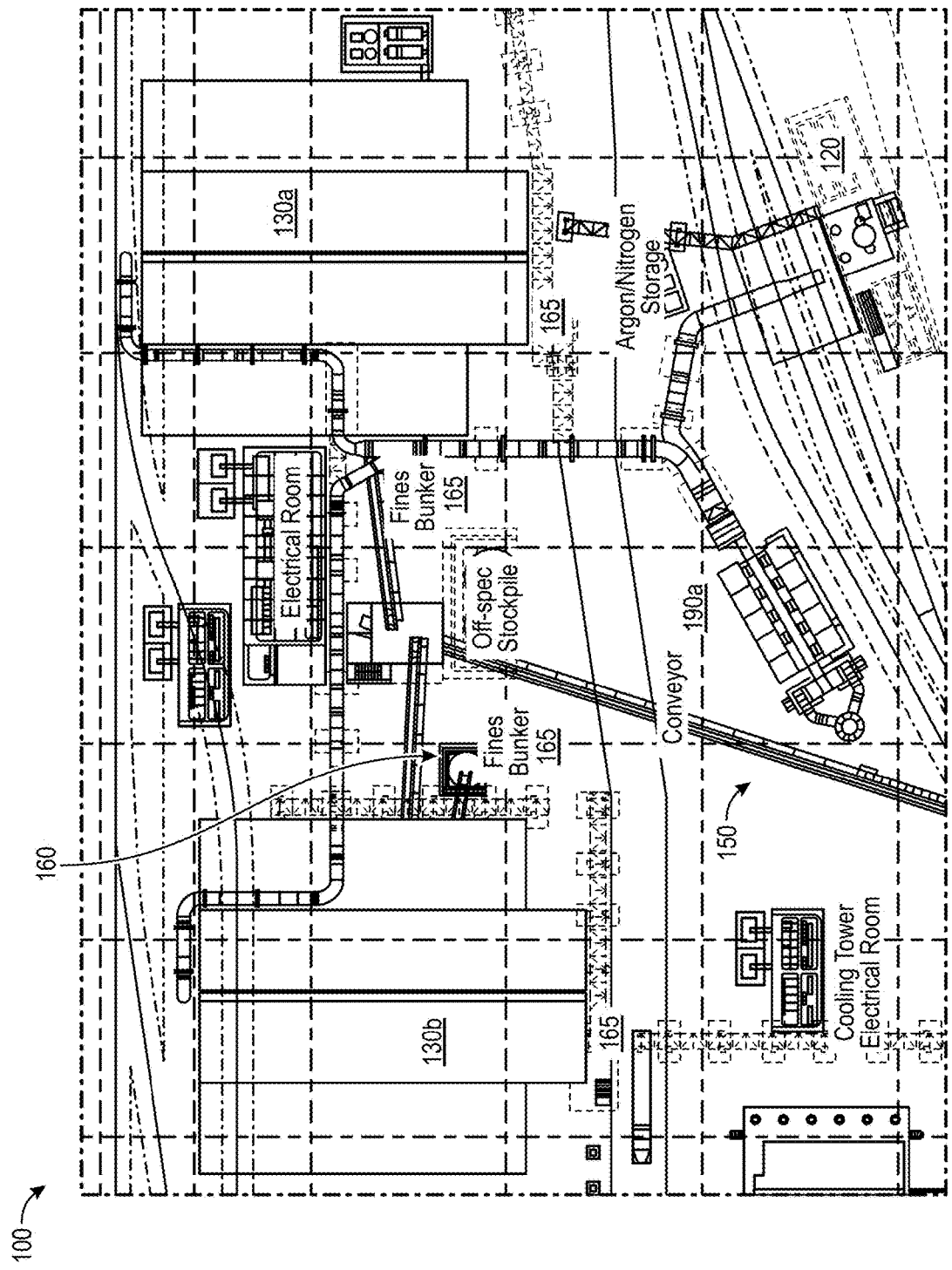
FIG. 3 is an enlarged view of the continuous GMU production system of FIG. 2.

Referring momentarily to FIG. 3, which is an enlarged plan view of the system 200, the desulfurization unit 120 can desulfurize the molten iron while the molten iron remains in the torpedo car 102. Once the molten iron is desulfurized, the torpedo car 102 can continue along the tracks to the granulator units 130. The torpedo car 102 can deliver the molten iron to either of the first granulator unit 130a or the second granulator unit 130b depending on, e.g., the availability of each of the granulator units 130. The GMU produced by each of the granulator units 130 can be transferred downstream via one or more conveyor belts that form part of the product handling unit 150. The fines produced by each of the granulator units 130 can be transferred to fines bunkers located adjacent to the granulator units 130 and ultimately sent to the loadout(s) 165. As shown in FIG. 3, the first dust collection unit 190a can be connected to each of the desulfurization unit 120 and the granulator units 130 via pipes to collect emissions therefrom.

Returning to FIG. 2, the cooling system 140 can be located adjacent to the granulator units 130 to provide cooling thereto as needed. The product handling unit 150 can include a stockpile area 252 for storing GMU products. One or more conveyor belts can extend between each of the granulator units 130 and the stockpile area 252, and between the stockpile area 252 and the loadout 155. In some embodiments, the loadout 155 comprises a building at which a desired quantity of GMUs can be measured and transferred to a railcar or other transfer vehicle. In some embodiments, the GMUs is subsequently transferred to an electric arc furnace (not shown) for steel production. The torpedo car 102, after delivering the molten iron to the granulator units 130, can continue along the tracks to reach the torpedo prep unit 170. As discussed above with reference to FIG. 1, the torpedo prep unit 170 can facilitate removal of slag and/or kish from the torpedo car 102. The second dust collection unit 190b can be connected to the torpedo prep unit 170 via pipes to collect emissions therefrom.

Referring to FIGS. 1-3 together, the system 100 is expected to be able to continuously produce GMU, unlike conventional GMU production systems. First, the inclusion of the desulfurization unit 120 provides several advantages. For example, GMUs with lower sulfur content produces less slag when melted at an electric arc furnace downstream, saving associated time, costs, and energy consumption. The use of GMUs with lower sulfur content can also ease maintaining the desired chemical composition and temperature, reducing the frequency of adjustments and interruptions during the melting cycle. Lower sulfur levels can also result in less wear and tear on other components of the system, reducing maintenance needs and associated downtime.

Second, the inclusion of a plurality of granulator units 130 allows molten iron to be granulated at separate granulator units in parallel. The granulator units 130 can also serve as backups for one another in case one of the granulator units 130 is down (e.g., due to malfunctioning components, maintenance, etc.). Furthermore, in some embodiments, the various components of the granulator units 130 are modular. For example, each of the components can be easily and independently removed (e.g., for maintenance) and/or replaced (e.g., via an overhead crane) without impacting operation of the other components.

Figure 4:
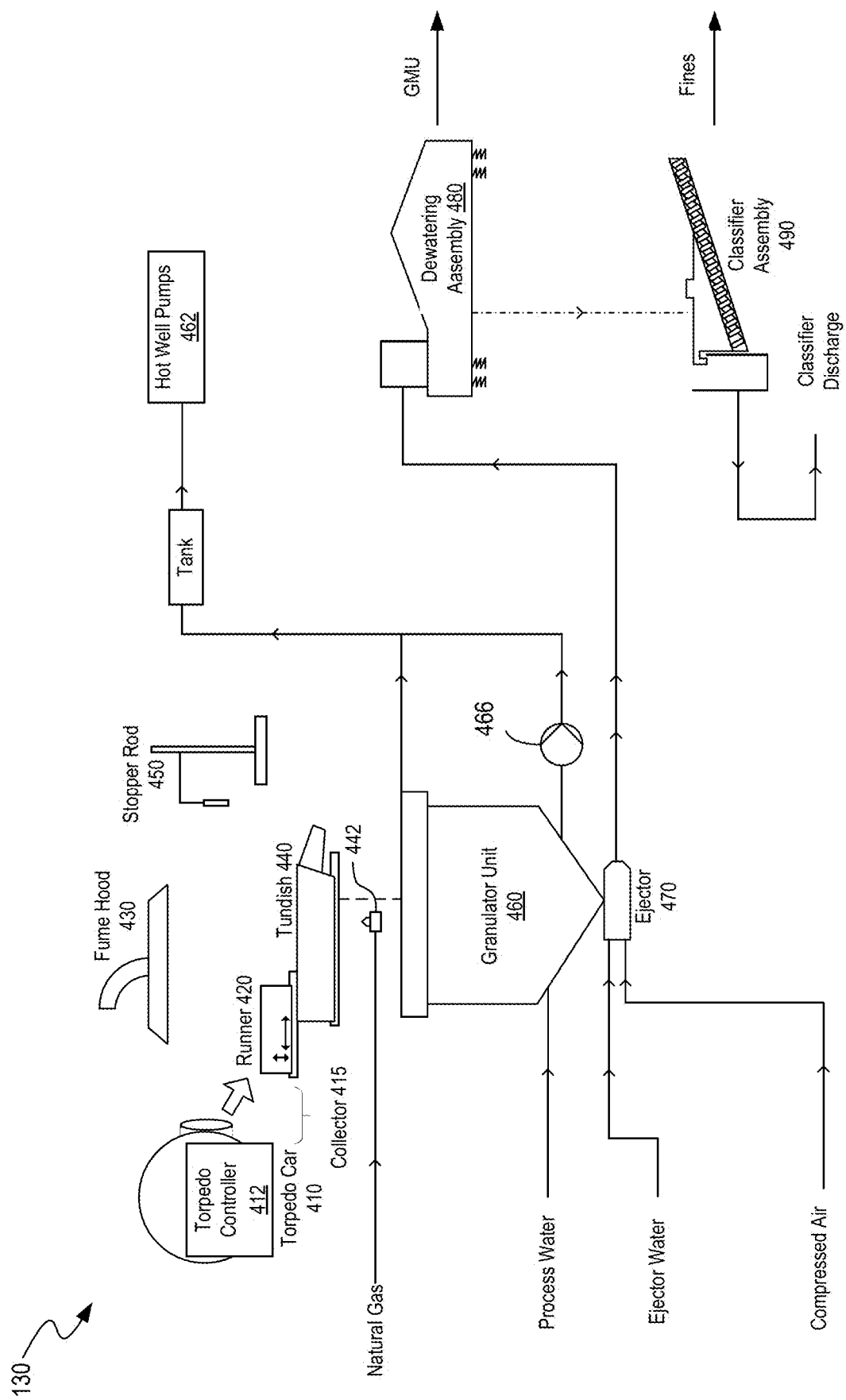
FIG. 4 is a schematic process flow diagram illustrating granulation of iron in accordance with embodiments of the present technology.

FIG. 4 is a schematic process flow diagram illustrating granulation of iron in accordance with embodiments of the present technology. A torpedo car 410 can transport molten metal from the furnace unit 110 or the desulfurization unit 120 to the granulation unit 130 (see FIG. 1). The torpedo controller 412 can control the tilt angle of the torpedo car 410 to transfer (e.g., pour) the molten metal from the torpedo car 410 to the runner 420 at a desired flow rate. In some embodiments, the molten metal is transferred from the torpedo car 410 to a ladle (not shown) instead, and the molten metal can be transferred from the ladle to the runner 420. The ladle can comprise a tilting ladle and/or include a slide gate or valve with associated controls. In some embodiments, the granulator unit 130 further includes a trough, bucket, tray, or other collector 415 positioned below the torpedo car 410, the ladle, the runner 420, and/or the tundish 440 to receive any molten metal or other material that may spill. The molten metal can flow through the runner 420 and into the tundish 440. The fume hood 430 (among other fume hoods) can be positioned to collect emissions from the molten metal flowing through the runner 420 and the tundish 440. The stopper rod assembly 450 can be coupled to the tundish 440 and operated to control the flow of molten metal out of the tundish 440 and into the granulation reactor 460. In some embodiments, a tundish nozzle preheater 442 is positioned to heat (e.g., using natural gas) the nozzle or outlet of the tundish 440 to, e.g., prevent the molten metal from solidifying at and blocking the outlet of the tundish 440.

The granulation reactor 460 can receive cool water from a cold water supply. The molten metal exiting the tundish 440 can impact a target of the granulation reactor 460 to be sprayed over the water pooled inside the granulation reactor 460. The granulation reactor 460 can granulate the molten metal to form granulated products, such as by cooling the molten metal. The heated water can be sent to a tank, hot well pumps 462, and eventually return to the cooling system 140. In some embodiments, a drain pump 466 is included between the granulation reactor 460 and the tank for maintenance purposes. The ejector 470 can receive ejector water and/or compressed air to transfer the granulated products from the granulation reactor 460 to the dewatering assembly 480. The dewatering assembly 480 can dry and filter (e.g., by size) the granulated products to output GMU products. In some embodiments, the first and second granulator units 130 are configured to produce GMU at a rate that matches an output rate of the furnace unit 110. The filtrate from the dewatering assembly 480 can be sent to the classifier assembly 490, which can sort out and output GMU fines. The classifier discharge (e.g., remaining water and particulates therein) can be directed to the sump pump 464 or other processing. The various components of the granulator units 130 can be powered electrically, hydraulically, and/or via other methods.

Figure 5:
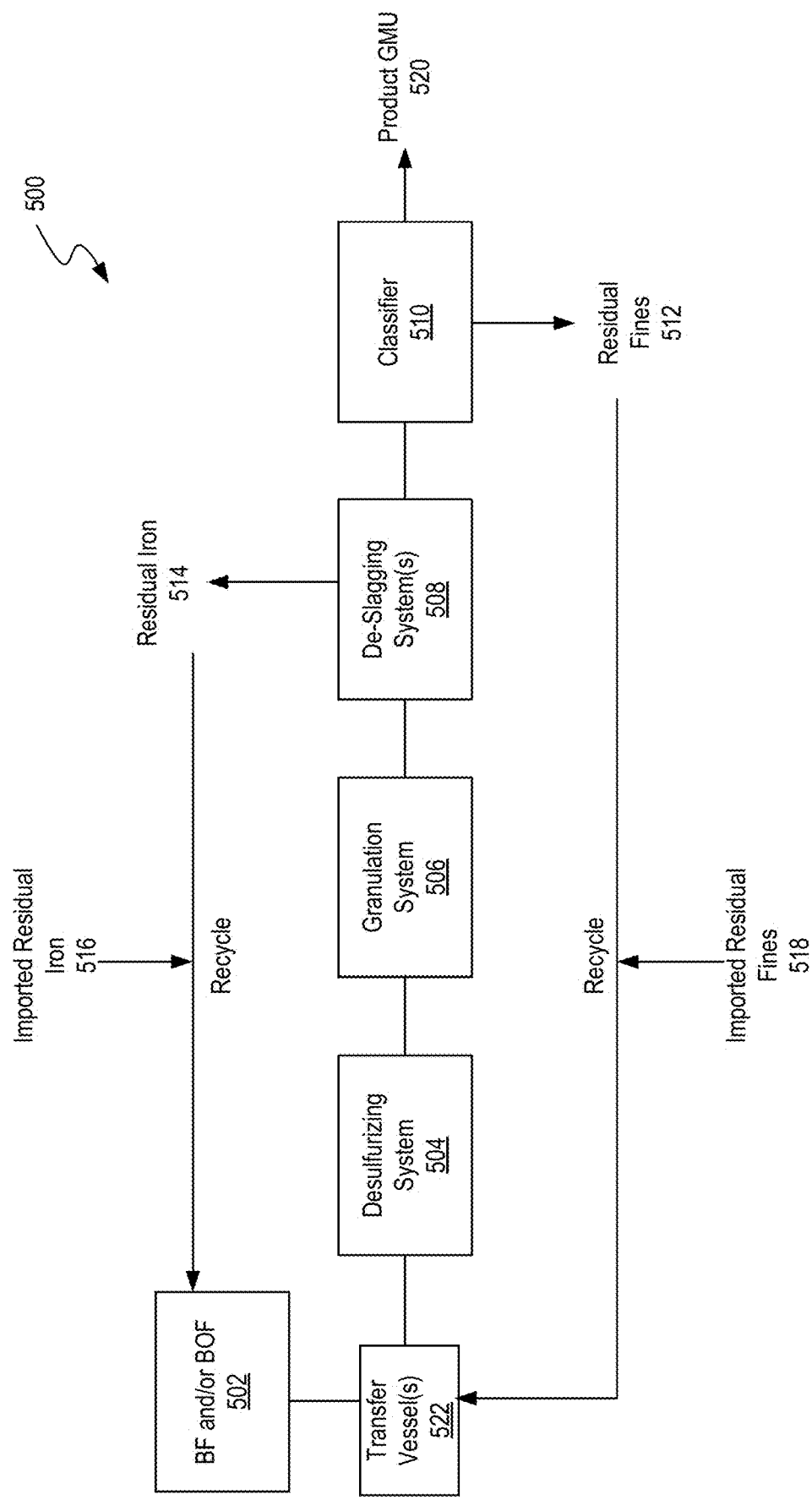
FIG. 5 is a block diagram illustration of a partial GMU production system, in accordance with embodiments of the present technology.

III. Embodiments of Residual Iron and Residual Fines Recycling in a GMU System FIG. 5 is a partial block diagram illustration of a GMU production system 500, in accordance with embodiments of the present technology. As explained elsewhere herein, the system 500 can be configured to produce GMUs, including GI, GPI, and/or GS. The system 500 corresponds to a portion of a GMU production system (e.g., the system 100 described with respect to FIG. 1 and system 130 described with respect to FIG. 4). The system 500 includes a blast furnace (BF) and/or basic oxygen furnace (BOF) 502 (also referred to as a furnace unit), one or more transfer vessels 522 (e.g., molten iron transfer vessels such as torpedo cars or ladle cars), a desulfurizing system 504 (also referred to as a desulfurizing unit), a granulation system 506 (also referred to as a granulation unit), a de-slagging system 508 (also referred to as a slag processor), and a classifier 510 (also referred to as a classifier assembly).

The BF and/or BOF 502 is configured to melt iron material (e.g., scrap iron) to form molten iron. The molten iron is transferred by the one or more transfer vessels 522 (e.g., ladle or torpedo car) to a desulfurization system 504 where the molten iron is treated to remove sulfur and/or other undesirable components. The molten iron is then transferred to the granulation system that includes, for example, a tundish (e.g., tundish 440 in FIG. 4) that receives the molten iron and a reactor that receives the molten iron from the tundish and produces GMUs by pouring the molten iron onto a target material. The granulating process includes cooling and solidifying the molten iron into GMUs in the reactor. The GMUs are processed by one or more de-slagging systems 508 to remove slag and residual iron produced during granulation as a byproduct. After de-slagging, the GMUs are transferred to the classifier 510 which separates the end-product GMU 520 from residual fines 512 based on a threshold particle size. The classifier 510 can be a screw (spiral) classifier, a vibrating screen classifier, a cyclonic classifier, a settling tank classifier, or any other suitable classifier. The threshold particle size can be, for example, 1 millimeter (mm), 2 mm, 3 mm, 4 mm, 5 mm, 6 mm, 7 mm, 8 mm, 9 mm, or 10 mm. The end-product GMU 520 having a particle size above the threshold particle size can be collected and stored in, for example, a GMU pellet stockpile. A GMU pellet stockpile can enable the transportation and management of GMUs in a convenient manner. A GMU pellet stockpile can be transported, for example, by rail. In some embodiments, the end-product GMU 520 comprises at least 95 wt. % of the iron input to the system 500 (e.g., at least 95 wt. %, 96 wt. %, 97 wt. %, 98 wt. %, or 99 wt. %. In some embodiments, the residual fines include less than 20%, 15%, 10%, 5%, 4%, 3%, 2%, or 1% by weight of the GMUs having the particle size above the threshold particle size.

The residual fines 512, which includes iron particles that have a particle size below the threshold particle size and are therefore not suitable for further processing, is recycled to the one or more transfer vessels 522 and mixed with the molten iron received from the BF and/or BOF 502. In some embodiments, the residual fines 512 constitutes no more than 0.5 wt. %, 1 wt. %, 2 wt. %, or 5 wt. % of the iron put into the system 500 (e.g., including the end product GMU 520). For example, the residual fines 512 can have a particle size below 1 mm and comprise 0.5 wt. % of the iron input to the system. The mixing can include melting the residual fines 512 with the molten iron in the transfer vessels 522. In some embodiments, the temperature of the residual fines is kept above a certain temperature during the recycling transfer to ensure that the residual fines 512 are at an appropriate temperature when added to the transfer vessels 522. Additionally or alternatively, the residual fines can be recycled to the transfer vessels continuously.

In some embodiments, the residual fines are heated by latent heat in the transfer vessels 522 to remove moisture from the residual fines (e.g., the residual fines are dried in the transfer vessels 522). The heating is performed before adding the molten metal from the BF and/or BOF 502. The residual fines 512 can be kept at the transfer vessels 522 at a temperature that is above a threshold temperature (e.g., above 212 degrees Celsius) for a particular time to remove all or nearly all moisture from the residual fines 512 so that the residual fines are dry when the molten iron received from the BF and/or BOF 502 is added. The drying can prevent splashing of the residual fines when the molten iron is added to melt the fines. The residual fines 512 are recycled by mixing the residual fines 512 with the molten iron before the desulfurizing system 504 and/or the de-slagging system 508 so that the recycled residual fines can be desulfurized and/or de-slagged (e.g., to remove slag from the residual fines). Recycling the residual fines 512 to the transfer vessels 522 instead as an input to the BF and/or BOF 502 can reduce losses that could arise when the residual fines having a small particle size would blow out on top of the BF and/or BOF 502. Further, adding the residual fines to the BF and/or BOF 502 could cause pressure drop issues at the BF and/or BOF 502.

FIG. 5 also shows recycling of residual iron 514 within the system 500. The de-slagging system 508 can separate residual iron 514 from other impurities in the slag produced as a byproduct. The residual iron 514 can have a range of particle sizes and can include a variety of material types. Residual iron can include any type of processed iron. As used herein, processed iron can include any processed material including iron that has been, for example, refined and/or alloyed in an industrial process. Examples of residual iron include thin pig, steel, skulls, sinter, scrap, slag, or iron dust. In some embodiments, de-slagging can include removing or skimming slag from the surface of the iron and collecting the slag in a slag pot (also known as a slag pan or slag ladle). The residual iron 514 can be further separated from the slag through various methods such as magnetic separation, gravity separation, or froth flotation. In some embodiments, de-slagging can include separating thin pig from other impurities. In some embodiments, thin pig comprises up to 1 wt. %, 2 wt. %, or 3 wt. % of the iron put into the system 500. In some embodiments, residual iron 514 (e.g., iron dust or thin pig) is collected by a cyclone separator coupled with the granulation system 506 or the de-slagging system 508. The cyclone separator can be configured to remove particulates from an air, gas, or liquid stream within the system 500 through vortex separation. In some embodiments, the thin pig is raked off the top of slag or via the slag pot. In some embodiments, residual iron 514 can include skulls that are solidified metal in the transfer vessels, tundish, reactor, or other containers of the system 500. Skulls can be removed from the system 500, for example, manually (e.g., using hammers, chisels, or scrapes) or mechanically (e.g., using tools such as pneumatic hammers or hydraulic breakers). In some embodiments, residual iron 514 can be further collected from the slag produced in the BF and/or BOF 502 and/or desulfurizing system 504 (e.g., after removal of sulfur).

The residual iron 514 collected during de-slagging or as part of any other processes of the system 500, is recycled by transferring the residual iron to the BF and/or BOF 502 to form molten iron. The residual iron can be mixed with the feedstock material (e.g., scrap iron) for the BF and/or BOF 502.

In some embodiments, the system 500 has a reduced iron loss percentage than a conventional granulated iron production system that does not recycle residual fines or the residual iron, as the system 500 does. For example, a conventional system can have a total iron loss of more than 5% whereas the system 500 has a total iron loss of no more than 5% (e.g., less than 4%, less than 3%, less than 2% or less than 1%.

In some embodiments, the system 500 can further receive imported residual fines 518 and/or imported residual iron 516 (e.g., materials produced by other iron production facilities) and recycle the imported residual fines 518 and/or imported residual iron 516 in a similar manner as the residual fines 512 and the residual iron 514 collected within the system 500.

Figure 6:
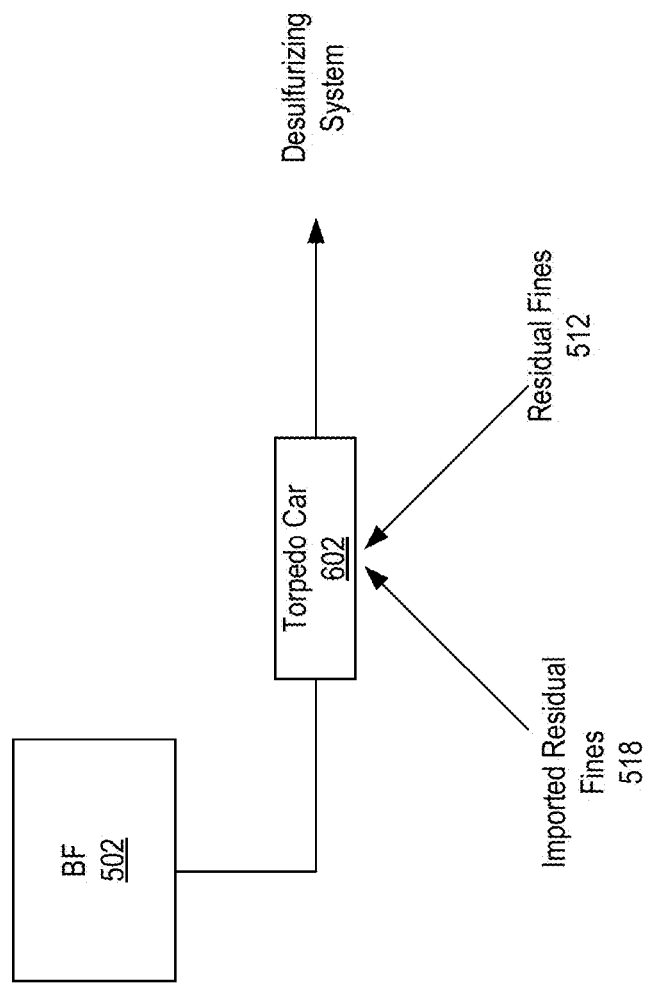
FIG. 6 is a block diagram illustration residual fines recycling in the GMU production system of FIG. 5, in accordance with embodiments of the present technology.

FIG. 6 is a block diagram illustration of residual fines recycling in the granulated iron production system 500 of FIG. 5, in accordance with embodiments of the present technology. As described with respect to FIG. 5, the residual fines 512 and optionally the imported residual fines 518 can be recycled by mixing the residual fines with the molten iron in the one or more transfer vessels 522. In the embodiment of FIG. 6, the one or more transfer vessels 522 include a torpedo car 602 (e.g., the torpedo car 102 described with respect to FIG. 1) and is configured to transfer the molten iron from BF 502 (or BOF) to further processing (e.g., to the desulfurizing system 506 in FIG. 5).

Figure 7:
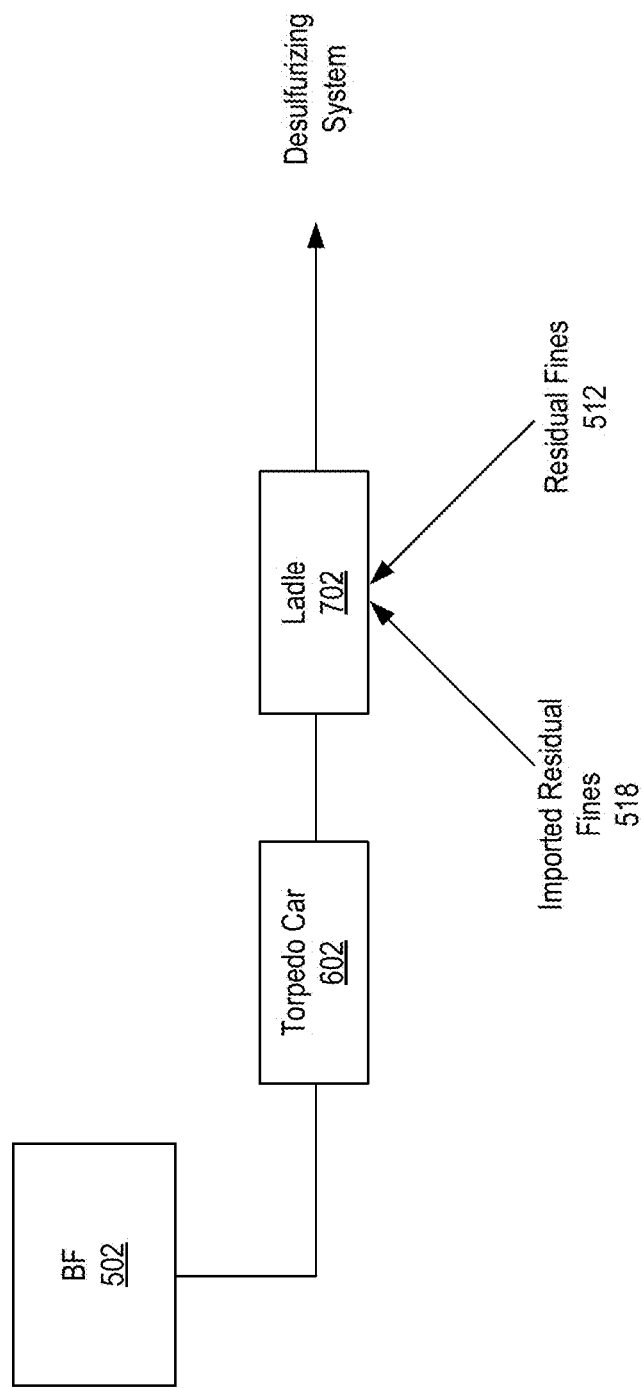
FIG. 7 is a block diagram illustration residual fines recycling in the GMU production system of FIG. 5, in accordance with embodiments of the present technology.

FIG. 7 is a block diagram illustration of residual fines recycling in the GMU production system 500 of FIG. 5, in accordance with embodiments of the present technology. As described with respect to FIG. 5, the residual fines 512 and optionally the imported residual fines 518 can be recycled by mixing the residual fines with the molten iron in the one or more transfer vessels 522. In the embodiment of FIG. 6, the one or more transfer vessels 522 include the torpedo car 602 and a ladle 702. In FIG. 7, the torpedo car 602 is configured to transfer the molten iron from BF 502 (or BOF) to the ladle 702. The ladle 702 is further configured to transfer the molten iron to further processing (e.g., to the desulfurizing system 506 in FIG. 5). As shown, in the embodiment of FIG. 7, the residual fines 512 and optionally the imported residual fines 518 are recycled to be mixed with the molten iron in the ladle 702.

As used herein, a torpedo car is an elongated, insulated transfer vessel for transferring molten iron that is mounted on railcars. In contrast, a ladle is an open-top vessel for transferring molten iron that can be moved manually or mechanically. The open-top design of the ladle 702 can enable chemical processing, such as desulfurization, deoxidation and/or de-slagging processes be performed while the residual fines 512 and the imported residual fines 518 are being mixed with the molten iron from the BF 502. In contrast, the torpedo car 602 can provide better temperature control for mixing the recycled fines with the molten iron due to its insulation. Therefore, in some embodiments, a combination of a torpedo car (configured for transportation) and a ladle (configured for chemical processing and transferring) is beneficial.

As described with respect to FIG. 5, in some embodiments the residual fines 512 are heated by latent heat in the torpedo car 602 and/or the ladle 702 to remove moisture (e.g., the residual fines are dried). The heating can be performed before adding the molten metal from the BF and/or BOF 502. For example, residual fines 512 are kept at the torpedo car 602 and/or the ladle 702 at a temperature that is above a threshold temperature (e.g., above 212 degrees Celsius) for a time required to dry the residual fines. The dry residual fines can then be combined with the molten iron received from the BF and/or BOF 502.

Figure 8:
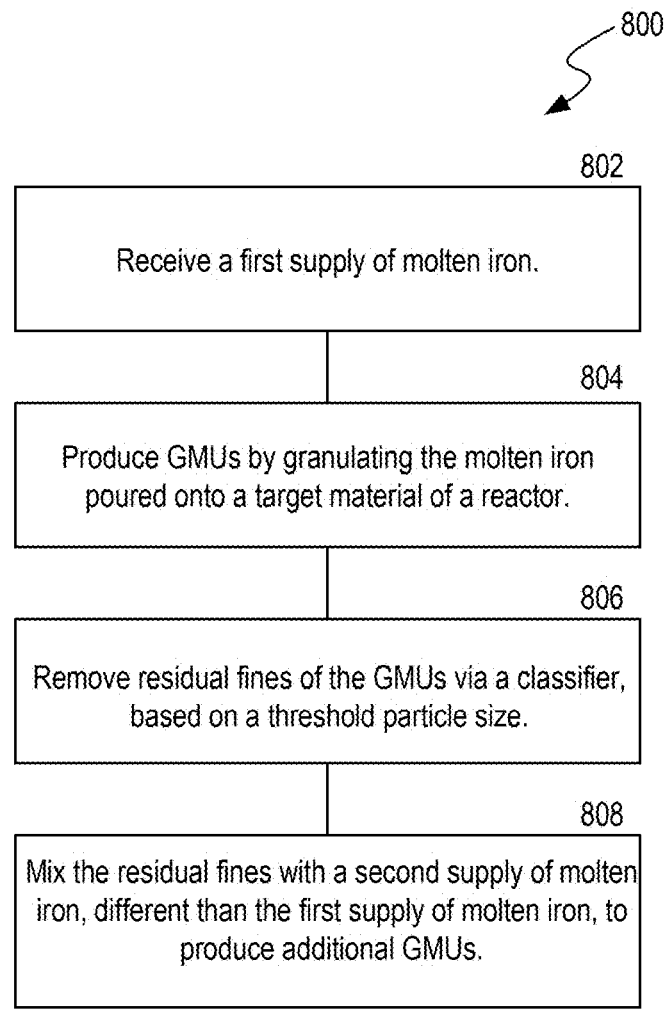
FIG. 8 is a flow diagram of a reduced-waste process for producing GMU, in accordance with embodiments of the present technology.

FIG. 8 is a flow diagram of a process 800 for producing GMU and/or reducing waste, in accordance with embodiments of the present technology. The process can be performed by the system 500 described with respect to FIG. 5. The process 800 includes receiving a first supply of molten iron (process portion 802). The molten iron can be produced by the BF and/or BOF 502 and provided by the one or more transfer vessels 522 to the desulfurizing system 504 and further to the granulation system 506.

The process 800 includes producing GMUs by granulating the molten iron poured onto a target material of a reactor (process portion 804). For example, the granulation system includes a reactor configured for granulating the molten iron to form the GMUs. The process 800 includes removing residual fines of the GMUs via a classifier (e.g., the classifier 510) (process portion 806). The classifier removes the residual fines based on a threshold particle size (e.g., the threshold particle size being 1 mm, 2 mm, 3 mm, or 4 mm) so that the residual fines 512 have a particle size below the threshold particle size and the product GMU 520 has a particle size equal to or above the threshold particle size. The process 800 includes mixing the residual fines with a second supply of molten iron (e.g., in the transfer vessels 522), which is different than the first supply of molten iron, to produce additional GMUs (process portion 808). In some embodiments, mixing the residual fines can include collecting the residual fines in a transfer vessel ((e.g., a torpedo car and/or ladle, as described elsewhere herein) and adding the second supply of molten iron to the transfer vessel, thereby melting the residual fines. The melted residual fines and second supply of molten iron can then be directed to produce additional GMUs via a granulation system (e.g., the granulation system 506).

In some embodiments, the process 800 includes producing residual iron as a byproduct of producing the GMUs (e.g., the residual iron 514 in FIG. 5). The residual iron can include one or more of thin pig, steel, skulls, sinter, scrap, slag, or iron dust. The residual iron can be collected during various processes in the system 500, such as during de-slagging, during desulfurizing, or transfer vessels, tundish, reactor, or other containers of the system 500. The process 800 can include mixing at least a portion of the residual iron with scrap metal to produce a blend and providing at least a portion of the blend to a BF and/or a BOF to produce the first supply of molten iron. In some embodiments, the process 800 includes additional steps not illustrated in FIG. 8. The additional steps may come before, after, or between process portions 802 and 808.

CONCLUSION

It will be apparent to those having skill in the art that changes may be made to the details of the above-described embodiments without departing from the underlying principles of the present technology. In some cases, well known structures and functions have not been shown or described in detail to avoid unnecessarily obscuring the description of the embodiments of the present technology. Although steps of methods may be presented herein in a particular order, alternative embodiments may perform the steps in a different order. Similarly, certain aspects of the present technology disclosed in the context of particular embodiments can be combined or eliminated in other embodiments. Furthermore, while advantages associated with certain embodiments of the present technology may have been disclosed in the context of those embodiments, other embodiments can also exhibit such advantages, and not all embodiments need necessarily exhibit such advantages or other advantages disclosed herein to fall within the scope of the technology. Accordingly, the disclosure and associated technology can encompass other embodiments not expressly shown or described herein, and the invention is not limited except as by the appended claims.

Throughout this disclosure, the singular terms "a," "an," and "the" include plural referents unless the context clearly indicates otherwise. The term "comprising," "including," and "having" should be interpreted to mean including at least the recited feature(s) such that any greater number of the same feature and/or additional types of other features are not precluded.

Reference herein to "one embodiment," "an embodiment," "some embodiments" or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments.

Unless otherwise indicated, all numbers expressing concentrations and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present technology. At the very least, and not as an attempt to limit the application of the doctrine of equivalents to the scope of the claims, each numerical parameter should at least be construed in light of the number of reported significant digits and by applying ordinary rounding techniques. Additionally, all ranges disclosed herein are to be understood to encompass any and all subranges subsumed therein. For example, a range of "1 to 10" includes any and all subranges between (and including) the minimum value of 1 and the maximum value of 10, i.e., any and all subranges having a minimum value of equal to or greater than 1 and a maximum value of equal to or less than 10, e.g., 5.5 to 10.

The disclosure set forth above is not to be interpreted as reflecting an intention that any claim requires more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

The present technology is illustrated, for example, according to various aspects described below as numbered clauses or embodiments (1, 2, 3, etc.) for convenience. These are provided as examples and do not limit the present technology. It is noted that any of the dependent clauses can be combined in any combination, and placed into a respective independent clause.

1. A method for producing granulated metallic units (GMUs), the method comprising:
   receiving a first supply of molten iron;
   producing GMUs by granulating the molten iron poured onto a target material of a reactor;
   removing residual fines of the GMUs via a classifier, based on a threshold particle size; and
   mixing the residual fines with a second supply of molten iron, different than the first supply of molten iron, to produce additional GMUs.

2. The method of any one of the clauses herein, wherein mixing the residual fines with the second supply of molten iron comprises melting the residual fines via the second supply of molten iron.

3. The method of any of one of the clauses herein, wherein mixing the residual fines comprises adding the residual fines to a transfer vessel having a temperature above a threshold temperature, the transfer vessel configured to remove moisture from the residual fines for a threshold time period, and melting the residual fines in the transfer vessel by adding molten iron to the transfer vessel.

4. The method of any one of the clauses herein, wherein mixing the residual fines comprises adding the residual fines to a transfer vessel, and melting the residual fines in the transfer vessel by adding molten iron to the transfer vessel.

5. The method of any one of the clauses herein, wherein the threshold particle size is no more than 1 millimeter (mm), 2 mm, 3 mm, 4 mm, 5 mm, 6 mm, 7 mm, 8 mm, 9 mm, or 10 mm.

6. The method of any one of the clauses herein, wherein the residual fines comprise less than 20%, 15%, 10%, 5%, 4%, 3%, 2%, or 1% by weight of the GMUs having the particle size above the threshold particle size.

7. The method of any one of the clauses herein, further comprising producing slag as a byproduct of producing the GMU particles, wherein the residual fines comprise no more than 70% 60%, 50%, 40%, 30%, or 20% by weight of the slag.

8. The method of any one of the clauses herein, further comprising before producing the GMUs, de-sulfurizing the molten iron.

9. The method of any one of the clauses herein, further comprising before producing the GMUs, decarbonizing the molten iron.

10. The method of any one of the clauses herein, further comprising:
producing slag as a byproduct of producing the GMUs;
separating residual iron from the slag;
mixing at least a portion of the residual iron with scrap metal to produce a blend; and
providing the at least a portion of the blend to a blast furnace and/or a basic oxygen furnace to produce molten iron.

11. The method of any one of the clauses herein, further comprising maintaining a temperature of the residual fines above a threshold temperature until mixing the residual fines with the second supply of molten iron.

12. The method of any one of the clauses herein, wherein the molten iron is received from a blast furnace.

13. The method of any one of the clauses herein, wherein the molten iron is received from a basic oxygen furnace.

14. The method of any one of the clauses herein, further comprising:
receiving imported residual fines;
mixing the imported residual fines with the second supply of molten iron in a transfer vessel to produce the GMUs.

15. The method of any one of the clauses herein, wherein mixing the residual fines comprises adding the residual fines to a ladle, removing moisture from the residual fines by heating, and melting the residual fines in the ladle by adding molten iron to the ladle.

16. The method of any one of the clauses herein, further comprising:
receiving imported residual iron;
mixing at least a portion of the residual iron with scrap metal to produce a blend; and
providing at least a portion of the blend to a blast furnace and/or a basic oxygen furnace to produce the first supply of molten iron.

17. The method of any one of the clauses herein, further comprising:
producing residual iron as a byproduct of producing the GMUs, the residual iron comprising one or more of thin pig, steel, skulls, sinter, scrap, slag, or iron dust;
mixing at least a portion of the residual iron with scrap metal to produce a blend; and
providing the at least a portion of the blend to a blast furnace and/or a basic oxygen furnace to produce the first supply of molten iron.

18. The method of any one of the clauses herein, wherein granulating comprises cooling and solidifying the molten iron poured onto the target material of the reactor.

19. A method for producing GMUs, the method comprising:
receiving a first supply of molten iron;
producing GMUs by granulating the molten iron poured onto a target material of a reactor;
removing residual iron as a byproduct of producing the GMUs, the residual iron comprising one or more of thin pig, steel, skulls, sinter, scrap, slag, or iron dust;
mixing at least a portion of the residual iron with additional metal to produce a blend; and
providing at least a portion of the blend to a blast furnace and/or a basic oxygen furnace to produce a second supply of molten iron, different than the first supply of molten iron, to produce additional GMUs.

20. The method of any one of the clauses herein, wherein removing the residual iron comprises separating the residual iron from slag produced as a byproduct of producing the GI particles.

21. The method of any one of the clauses herein, further comprising:
removing residual fines of the GI particles via a classifier, based on a threshold particle size; and
mixing the residual fines with a second supply of molten iron, different than the first supply of molten iron, to produce additional GI particles.

22. A system for producing granulated iron (GI), the system comprising:
a transfer vessel configured to receive molten iron;
a granulation system configured to receive the molten iron from the transfer vessel, the granulation system including:
a tundish positioned to receive the molten iron,
a reactor downstream of the tundish and positioned to receive the molten iron the from tundish and produce GI particles;
a classifier positioned to receive the GI particles from the reactor and separate residual fines from the GI particles based on a threshold particle size; and
wherein the transfer vessel is further configured to receive the residual fines.

23. The system of any one of the clauses herein, wherein the transfer vessel is a torpedo car.

24. The system of any one of the clauses herein, wherein the transfer vessel is a ladle.

25. The system of any one of the clauses herein, further comprising a blast furnace and/or a basic oxygen furnace configured to produce the molten iron.

26. The system of any one of the clauses herein, further comprising a de-sulfuring system configured to de-sulfurize the molten iron before molten iron is received by the granulation system.

27. The system of any one of the clauses herein, further comprising a de-slagging system downstream of the granulation system and configured to:
obtain residual iron from slag produced as a byproduct of producing the GI particles, the residual iron comprising at least one of thin pig, steel, skulls, sinter, scrap, slag, or iron dust; and
provide the residual iron to a blast furnace and/or a basic oxygen furnace to produce the molten iron.

28. The system of any one of the clauses herein, wherein the transfer vessel is configured to receive imported residual fines and mix the imported residual fines with the molten iron in the transfer vessel to produce additional GI particles.

29. The system of any one of the clauses herein, further comprising a blast furnace and/or a basic oxygen furnace configured to:
receive imported residual iron from an imported residual iron source;
mix the imported residual iron with scrap metal to produce a blend; and
provide the at least a portion of the blend to a blast furnace and/or a basic oxygen furnace to produce molten iron.

We claim:
1. A method for producing granulated metallic units (GMUs), the method comprising:
receiving a first supply of molten iron;
producing GMUs by granulating the molten iron poured onto a target material of a reactor;

removing residual fines of the GMUs via a classifier, based on a threshold particle size between 1-10 mm; and mixing the residual fines with a second supply of molten iron, different than the first supply of molten iron, to produce additional GMUs.

2. The method of claim 1, wherein mixing the residual fines with the second supply of molten iron comprises melting the residual fines via the second supply of molten iron.

3. The method of claim 1, wherein mixing the residual fines comprises adding the residual fines to a transfer vessel, and melting the residual fines in the transfer vessel by adding molten iron to the transfer vessel.

4. The method of claim 1, wherein the threshold particle size is between 1-6 mm.

5. The method of claim 1, wherein the residual fines comprise less than 5% by weight of the GMUs having the particle size above the threshold particle size.

6. The method of claim 1, further comprising producing slag as a byproduct of producing the GMUs, wherein the residual fines comprise no more than 60% by weight of the slag.

7. The method of claim 1, further comprising:
producing slag as a byproduct of producing the GMUs;
separating residual iron from the slag;
mixing at least a portion of the residual iron with scrap metal to produce a blend; and
providing at least a portion of the blend to a blast furnace and/or a basic oxygen furnace to produce molten iron.

8. The method of claim 1, further comprising maintaining a temperature of the residual fines above a threshold temperature until mixing the residual fines with the second supply of molten iron.

9. The method of claim 1, wherein the molten iron is received from a blast furnace.

10. The method of claim 1, wherein the molten iron is received from a basic oxygen furnace.

11. The method of claim 1, further comprising:
receiving imported residual fines;
mixing the imported residual fines with the second supply of molten iron in a transfer vessel to produce the GMUs.

12. The method of claim 1, wherein mixing the residual fines comprises adding the residual fines to a ladle, and melting the residual fines in the ladle by adding molten iron to the ladle.

13. The method of claim 1, further comprising:
receiving imported residual iron;
mixing at least a portion of the residual iron with scrap metal to produce a blend; and
providing at least a portion of the blend to a blast furnace and/or a basic oxygen furnace to produce the first supply of molten iron.

14. The method of claim 1, further comprising:
producing residual iron as a byproduct of producing the GMUs, the residual iron comprising one or more of thin pig, steel, skulls, sinter, slag, scrap, or iron dust;
mixing at least a portion of the residual iron with scrap metal to produce a blend; and
providing at least a portion of the blend to a blast furnace and/or a basic oxygen furnace to produce the first supply of molten iron.

15. A method for producing granulated metallic units (GMUs), the method comprising:
receiving a first supply of molten iron from a blast furnace and/or a basic oxygen furnace;
producing GMUs by granulating the molten iron poured onto a target material of a reactor;
removing residual iron as a byproduct of producing the GMUs, the residual iron comprising one or more of thin pig, steel, skulls, sinter, slag, scrap, or iron dust;
mixing at least a portion of the residual iron with scrap metal to produce a blend; and
providing at least a portion of the blend to the blast furnace and/or the basic oxygen furnace to produce a second supply of molten iron, different than the first supply of molten iron, to produce additional GMUs.

16. The method of claim 15, wherein removing the residual iron comprises separating the residual iron from slag produced as a byproduct of producing the GMUs.

17. The method of claim 15, further comprising:
removing residual fines of the GMUs via a classifier, based on a threshold particle size; and
mixing the residual fines with a second supply of molten iron, different than the first supply of molten iron, to produce additional GMUs.

18. The method of claim 15, further comprising removing residual fines of the GMUs based on a threshold particle size between 1-10 mm.

* * * * *